(12) United States Patent
Ziegler et al.

(10) Patent No.: US 11,098,787 B2
(45) Date of Patent: Aug. 24, 2021

(54) REAR DERAILLEUR DAMPENING ASSEMBLY

(71) Applicant: The Cycle Group, Anaheim, CA (US)

(72) Inventors: Jonathan Ziegler, Wofford Heights, CA (US); Casey Weiss, Costa Mesa, CA (US); Ethan Fiamingo, Anaheim, CA (US)

(73) Assignee: The Cycle Group, Anaheim, CA (US)

( * ) Notice: Subject to any disclaimer, the term of this patent is extended or adjusted under 35 U.S.C. 154(b) by 334 days.

(21) Appl. No.: 16/111,138

(22) Filed: Aug. 23, 2018

(65) Prior Publication Data

US 2019/0063547 A1 Feb. 28, 2019

Related U.S. Application Data

(60) Provisional application No. 62/550,523, filed on Aug. 25, 2017.

(51) Int. Cl.
| | | |
|---|---|---|
| *F16F 15/129* | (2006.01) | |
| *B62M 9/124* | (2010.01) | |
| *B62M 9/128* | (2010.01) | |
| *B62M 9/126* | (2010.01) | |

(52) U.S. Cl.
CPC ......... *F16F 15/1292* (2013.01); *B62M 9/124* (2013.01); *B62M 9/126* (2013.01); *B62M 9/128* (2013.01)

(58) Field of Classification Search
CPC ........ B62M 9/126; B62M 9/16; B62M 9/122; B62M 9/1248; B62M 9/121
USPC ...................................................... 474/80, 82
See application file for complete search history.

(56) References Cited

U.S. PATENT DOCUMENTS

| | | | | |
|---|---|---|---|---|
| 4,406,643 A | * | 9/1983 | Shimano | B62M 9/126 474/80 |
| 6,135,904 A | * | 10/2000 | Guthrie | B62M 9/122 474/82 |
| 8,202,182 B2 | * | 6/2012 | Ishikawa | B62M 9/1348 474/82 |
| 8,852,041 B2 | * | 10/2014 | Yamaguchi | B62M 9/126 474/80 |
| 8,870,692 B2 | * | 10/2014 | Yamaguchi | B62M 9/126 474/80 |
| 8,870,693 B2 | * | 10/2014 | Shahana | B62M 9/121 474/80 |

(Continued)

OTHER PUBLICATIONS

ISA/US; International Search Report in co-pending PCT International Application No. PCT/US18/47829 dated Nov. 29, 2018.

*Primary Examiner* — Henry Y Liu
(74) *Attorney, Agent, or Firm* — Matthew J. Spark; Stefan J. Kirchanski; Zuber Lawler LLP

(57) ABSTRACT

A rear derailleur assembly for mounting to a bicycle, wherein the bicycle includes a frame, includes an upper body for operationally engaging the rear derailleur assembly to the frame. The rear derailleur assembly also include a chain cage for engaging a chain of the bicycle; a controller pivotally connected to the upper body; and a lower body operationally connected to the chain cage, pivotally connected to the controller, and pivotally connected to the chain cage. The lower body includes a damper assembly for providing rotational resistance as the chain cage rotates in a first direction about the pivot axis.

4 Claims, 6 Drawing Sheets

(56) References Cited

U.S. PATENT DOCUMENTS

| | | | | |
|---|---|---|---|---|
| 8,882,618 B2* | 11/2014 | Yamaguchi | B62M 9/122 | 474/82 |
| 8,900,078 B2* | 12/2014 | Yamaguchi | B62M 9/122 | 474/80 |
| 8,974,331 B2* | 3/2015 | Yamaguchi | B62M 9/122 | 474/82 |
| 9,005,059 B2* | 4/2015 | Suyama | B62M 9/122 | 474/82 |
| 9,187,149 B2* | 11/2015 | Yamaguchi | B62M 9/126 | |
| 9,227,696 B2* | 1/2016 | Yamaguchi | B62M 9/126 | |
| 9,228,643 B2* | 1/2016 | Yamaguchi | B62M 9/16 | |
| 9,303,763 B2* | 4/2016 | Yamaguchi | B62M 9/1242 | |
| 9,377,089 B2* | 6/2016 | Yamaguchi | B62M 9/16 | |
| 9,463,846 B2* | 10/2016 | Chang | B62M 9/1248 | |
| 9,475,547 B2* | 10/2016 | Jordan | B62M 9/1248 | |
| 9,669,900 B2* | 6/2017 | Shirai | F16H 7/1236 | |
| 9,845,134 B2* | 12/2017 | Takachi | B62M 9/1248 | |
| 10,086,904 B2* | 10/2018 | Lin | B62M 9/124 | |
| 10,189,542 B2* | 1/2019 | Wu | B62M 9/1242 | |
| 10,351,208 B2* | 7/2019 | Yamaguchi | B62M 9/122 | |
| 10,435,110 B2* | 10/2019 | Calendrille | B62M 9/121 | |
| 10,435,111 B2* | 10/2019 | Shipman | B62M 9/16 | |
| 10,577,053 B2* | 3/2020 | Brown | B62M 9/1248 | |
| 2007/0219029 A1* | 9/2007 | Turner | B62M 9/16 | 474/80 |
| 2009/0054183 A1* | 2/2009 | Takachi | B62M 9/1248 | 474/80 |
| 2009/0291789 A1* | 11/2009 | Ishikawa | B62M 9/1248 | 474/82 |
| 2012/0083371 A1 | 4/2012 | Yamaguchi et al. | | |
| 2013/0203532 A1* | 8/2013 | Jordan | B62M 9/1248 | 474/82 |
| 2014/0371013 A1* | 12/2014 | Yamaguchi | B62M 9/16 | 474/122 |
| 2016/0046352 A1 | 2/2016 | Shipman et al. | | |
| 2016/0176478 A1 | 6/2016 | Chang | | |
| 2016/0304160 A9* | 10/2016 | Chang | B62M 9/121 | |
| 2017/0113760 A1* | 4/2017 | Lin | B62M 9/1248 | |
| 2017/0174289 A1* | 6/2017 | Wu | B62M 9/16 | |

* cited by examiner

REAR DERAILLEUR DAMPENING ASSEMBLY

FIELD OF THE INVENTION

The present invention relates generally to bicycle derailleurs. More particularly, the present invention is directed to a dampening assembly for a rear derailleur.

BACKGROUND OF THE INVENTION

Bicycles have been used for recreation, transportation, and sporting competition for decades, and can be found in all types of environments (e.g., urban, suburban, and rural). What started out as a relatively simple assembly of components has evolved into more complex forms as bicycles have been adapted from general use (e.g., transportation, exercise) to more specific niches (e.g., Olympic-style track racing, BMX-style racing, cross-country cycling, etc.).

As bicycle use has changed, the cycling industry has adapted and improved various components of the bicycle in order to meet the evolving needs of the cycling public. A bicycle rear derailleur is one such component. The purpose of a rear derailleur is to assist in changing the speed of a bicycle by selectively moving a bicycle chain between gears of a cassette located near a rear wheel of the bicycle. A typical rear derailleur has a base member connected to the bicycle near the rear wheel, a chain cage (or chain guide) engaging the bicycle chain, and a movable member connecting the base member and the chain cage so as to move the chain cage laterally relative to the base member. Movement of the chain cage moves the bicycle chain between the gears of the gear cassette. A rider is able to shift gears due to a shift control device (or shifter) mounted on or near the bicycle's handlebar. One end of a control cable running down the length of the bicycle is connected to the shift control device and the other end of the control cable is connected the rear derailleur. The shift control device adjusts the amount of tension on the control cable. The shift control device allows the rider to pull (increase tension) or release (decrease tension) the control cable. An increase or decrease in tension on the control cable determines the direction on the gear cassette in which the bicycle chain moves (i.e., from lower gear to higher gear or from higher gear to lower gear). Increasing tension on the control cable causes the chain cage to laterally move in one direction relative to the base member (which, in turn, moves the bicycle chain in that same direction), while releasing tension on the control cable causes the chain cage to laterally move in another direction relative to the base member (generally the opposite direction the chain cage moves in when tension is increased). Thus, the chain cage (and bicycle chain) can be moved laterally by increasing or decreasing tension on the control cable.

During use, a bicycle can be ridden over a variety of surfaces and terrains including, without limitation, smooth surfaces (e.g., paved surfaces), rough surfaces (e.g., dirt roads, off-road terrain), and the like that can subject the bicycle to various conditions including, without limitation, bouncing, vibration, and the like. There may be hazards including, without limitation, potholes, rocks, and the like. These various conditions and hazards can impact the bicycle in various ways including, without limitation, causing a bicycle rider to crash, causing the bicycle chain to become disengaged from the gear cassette, causing the control cable to become disconnected from the rear derailleur, or the like. For example, when the bicycle is moving on a rough surface, uncontrolled movement of the chain cage can result in the chain cage moving back and forth between the direction of chain tensioning and in the opposite direction. This can result in the bicycle chain bouncing to the extent the bicycle chain becomes disengaged from a portion of the chain cage (e.g., the drive sprocket or front chain ring) and/or the gear cassette.

Different types of rear derailleurs have been proposed to address uncontrolled movement of the chain cage that could result in the chain cage moving back and forth between the direction of chain tensioning and in the opposite direction. However, such rear derailleurs have their limitations and can always be improved.

Accordingly, there is a need for an improved rear derailleur to control movement of the chain cage back and forth between the direction of chain tensioning and in the opposite direction. There is a further need for an improved rear derailleur to reduce movement of the chain cage back and forth between the direction of chain tensioning and in the opposite direction. There is also a need for a rear derailleur that can mitigate the effects of various conditions and hazards that can impact engagement of the bicycle chain and the rear derailleur. There is an additional need for a rear derailleur that is easier to manufacture, assemble, adjust, and maintain. The present invention satisfies these needs and provides other related advantages.

SUMMARY OF THE INVENTION

An improved rear derailleur that can maintain tension on the bicycle chain. An improved rear derailleur that can mitigate the effects of various conditions and hazards that can impact engagement of the bicycle chain and the rear derailleur is provided. An improved rear derailleur that is easier to manufacture, assemble, adjust, and maintain is provided.

As discussed above, a rear derailleur of a bicycle includes a chain cage (chain guide) that maintains tension on the bicycle chain. The chain cage (chain guide) is coupled to a movable member. In order to maintain function of the drive system, the bicycle chain must have proper tension to stay seated on the pulleys (cogs) of the chain cage when the bicycle hits a bump on a surface. However, if there is no damper in the system, the chain cage (chain guide) may rotate beyond a reasonable amount in certain rough conditions. A reasonable amount is defined as the point where the bicycle chain will not become unseated from the pulleys (cogs). When the bicycle chain becomes unseated from the pulleys (cogs), the bicycle chain can "derail," making the drive system inoperable. To maintain a reasonable amount of chain guide rotation, a damper assembly is added to the system. The damper assembly includes an input shaft connected to the chain guide, a one-way bearing, a bearing housing, one or more friction discs, one or more intermediate discs, a pressure plate, a single or series of springs that apply an axial force and a clamp bolt. The damper assembly is coupled to both the movable member and the chain guide. The damper assembly functions in a way controls movement of the chain cage back and forth between the direction of chain tensioning and in the opposite direction.

In an embodiment of the present invention, a rear derailleur assembly for mounting to a bicycle, wherein the bicycle includes a frame, includes an upper body for operationally engaging the rear derailleur assembly to the frame; a chain cage for engaging a chain of the bicycle; a controller pivotally connected to the upper body; and a lower body operationally connected to the chain cage, pivotally connected to the controller, and pivotally connected to the chain cage about a pivot axis. The lower body includes a damper assembly for providing rotational resistance as the chain cage rotates in a first direction about the pivot axis.

In another embodiment of the present invention, the lower body includes a recess within which the damper assembly is disposed; wherein the damper assembly includes a spline pattern; and wherein the recess includes a spline pattern configured to engage the spline pattern of the damper assembly such that a portion of the damper assembly is stationary relative to the lower body.

In a further embodiment of the present invention, the damper assembly includes an input shaft engaging the chain cage and rotational therewith; a friction clutch; and a one-way bearing engaging the friction clutch and the input shaft; wherein the friction clutch engages the one-way bearing so that when the input shaft rotates with respect to the lower body in a second direction opposite the first direction, the one-way bearing rotates with the input shaft in the second direction.

In yet another embodiment of the present invention, the damper assembly includes a disc assembly, and a clamp bolt; wherein rotation of the clamp bolt in a first direction increases axial force on the disc assembly and rotation of the clamp bolt in a second direction opposite the first direction decreases axial force on the disc assembly, and wherein the axial force provides rotational resistance of the chain cage relative to the lower body.

In still another embodiment of the present invention, the rear derailleur assembly further includes a spring biasing the chain cage in one direction; and wherein the spring engages the damper assembly so that torsional force is transmitted to the damper assembly.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts.

DETAILED DESCRIPTION OF THE INVENTION

Figure 1:
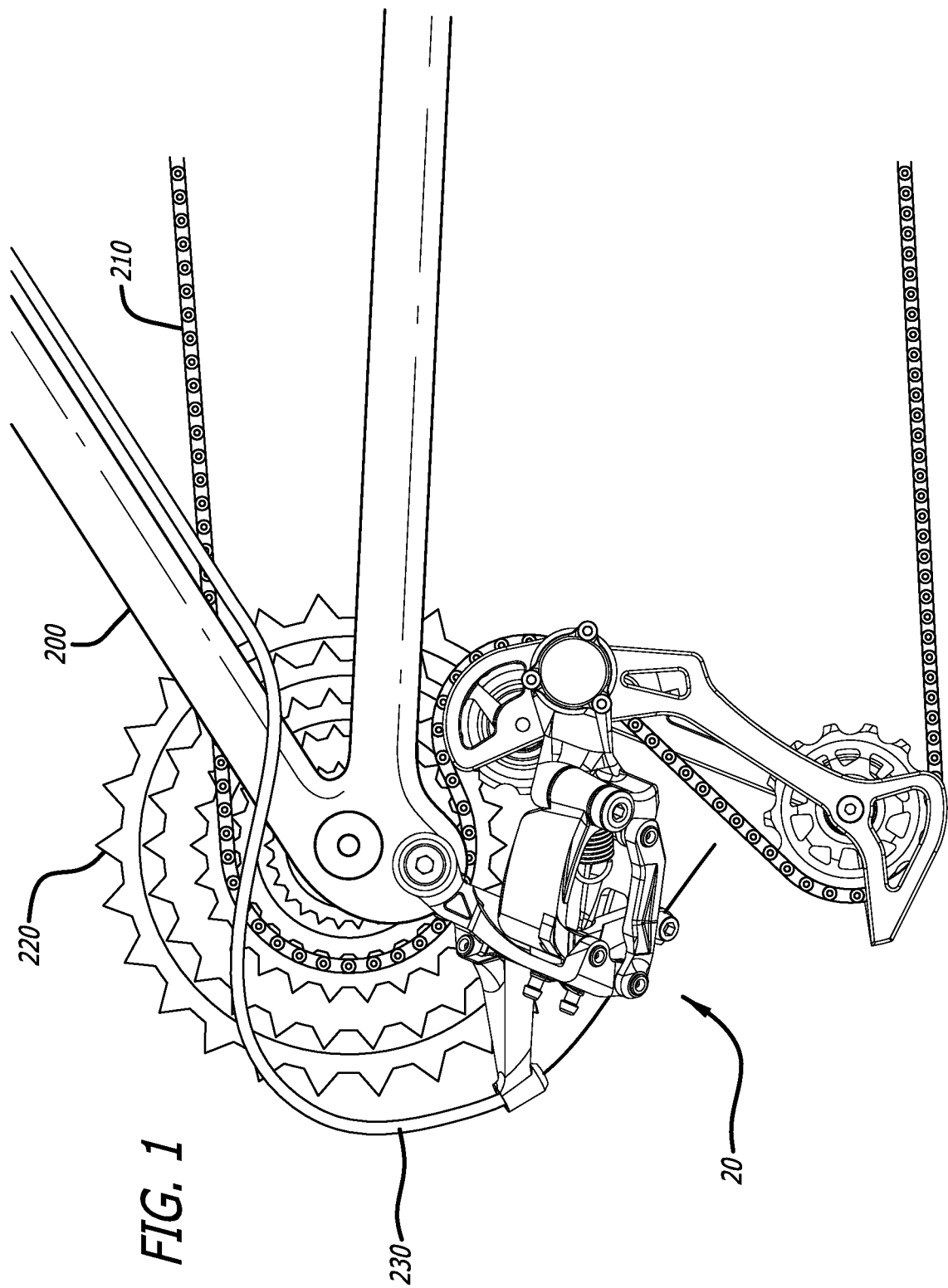
FIG. 1 illustrates a view of a rear derailleur assembly, in accordance with an embodiment of the present invention, engaging a bicycle frame, near a rear axle of the bicycle frame.

The following detailed description describes the present embodiments, with reference to the accompanying drawings. In the drawings, reference numbers label elements of the present embodiments. These reference numbers are reproduced below in connection with the discussion of the corresponding drawing features.

It is to be understood that the figures and descriptions of the present invention have been simplified to illustrate elements that are relevant for a clear understanding of the present invention, while eliminating, for the purpose of clarity, many other elements found in rear derailleurs. Those of ordinary skill in the pertinent arts may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the pertinent arts.

Figure 2:
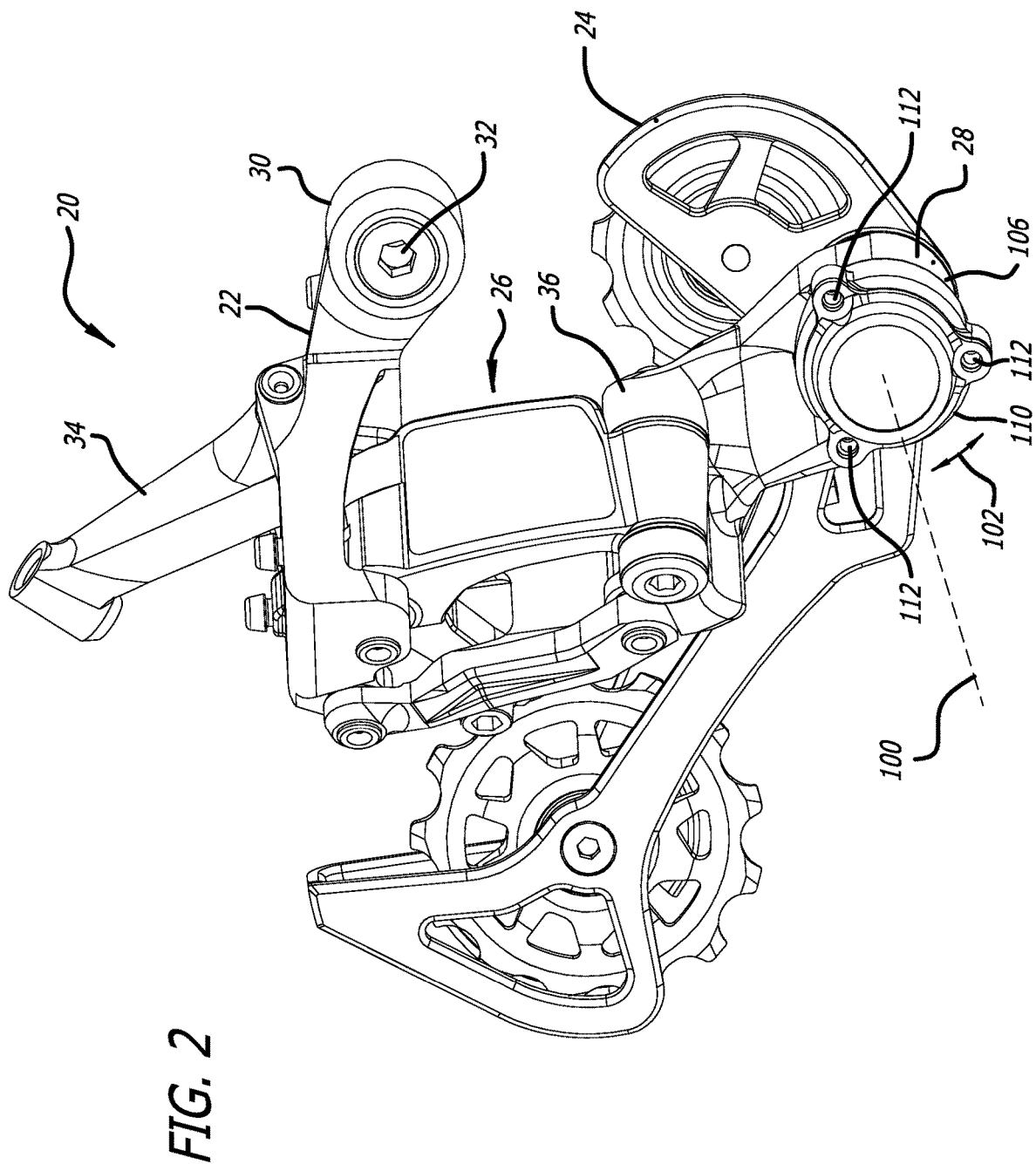
FIG. 2 illustrates another view of the rear derailleur assembly of FIG. 1.
Figure 3:
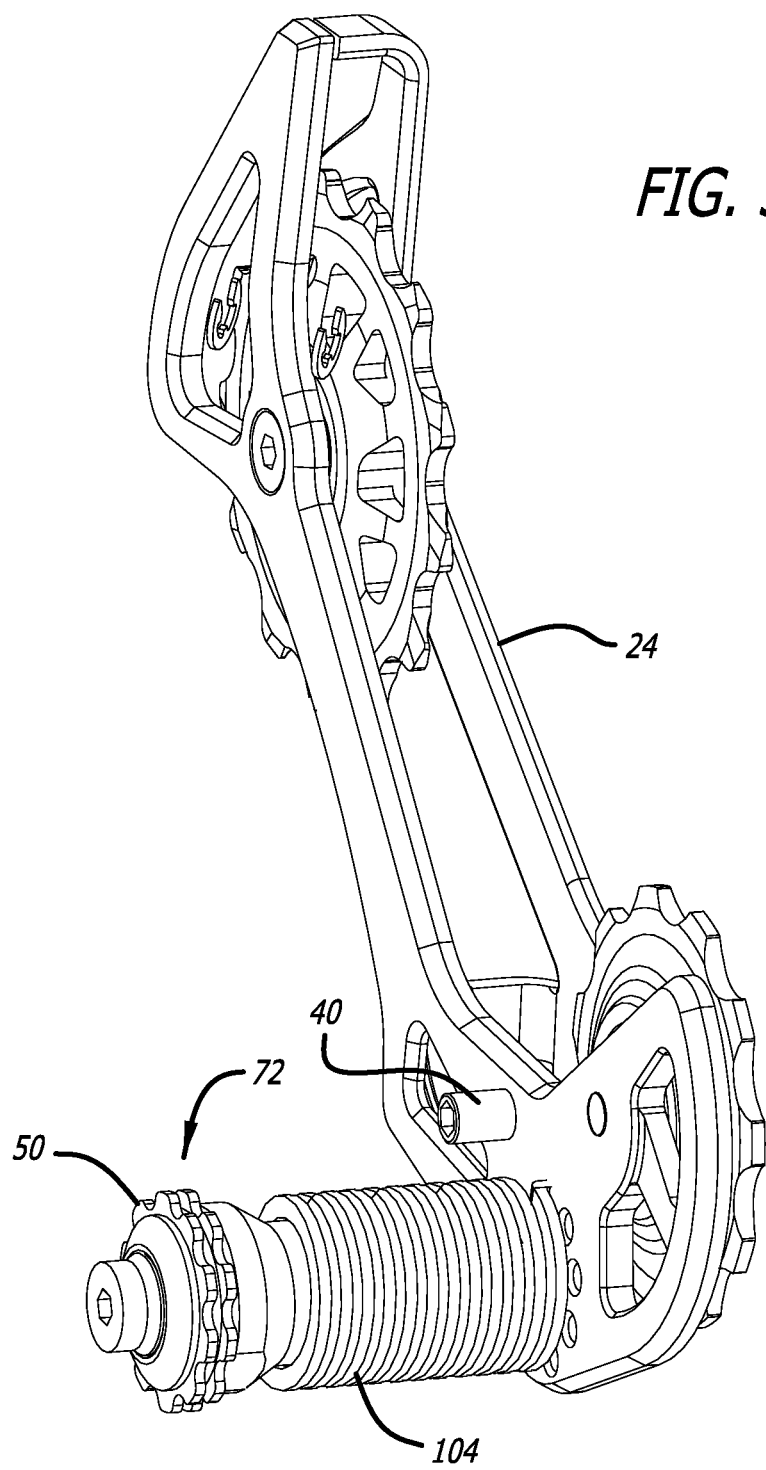
FIG. 3 illustrates a view of a chain cage of the rear derailleur of FIG. 2, with the remainder of the rear derailleur not shown so as to clearly illustrate a damper assembly embodying the present invention.
Figure 4:
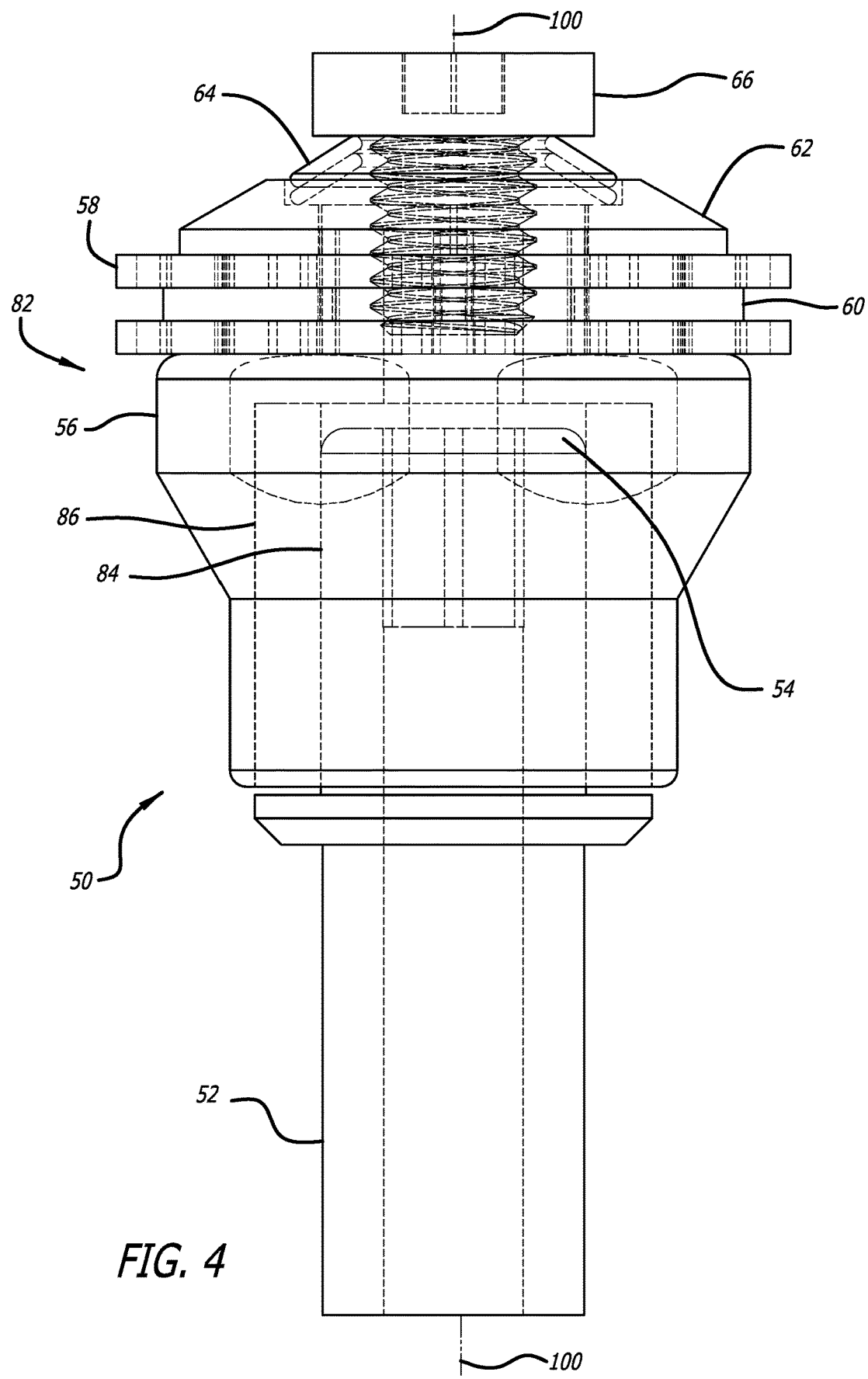
FIG. 4 illustrates a side view of the damper assembly of FIG. 3.
Figure 5:
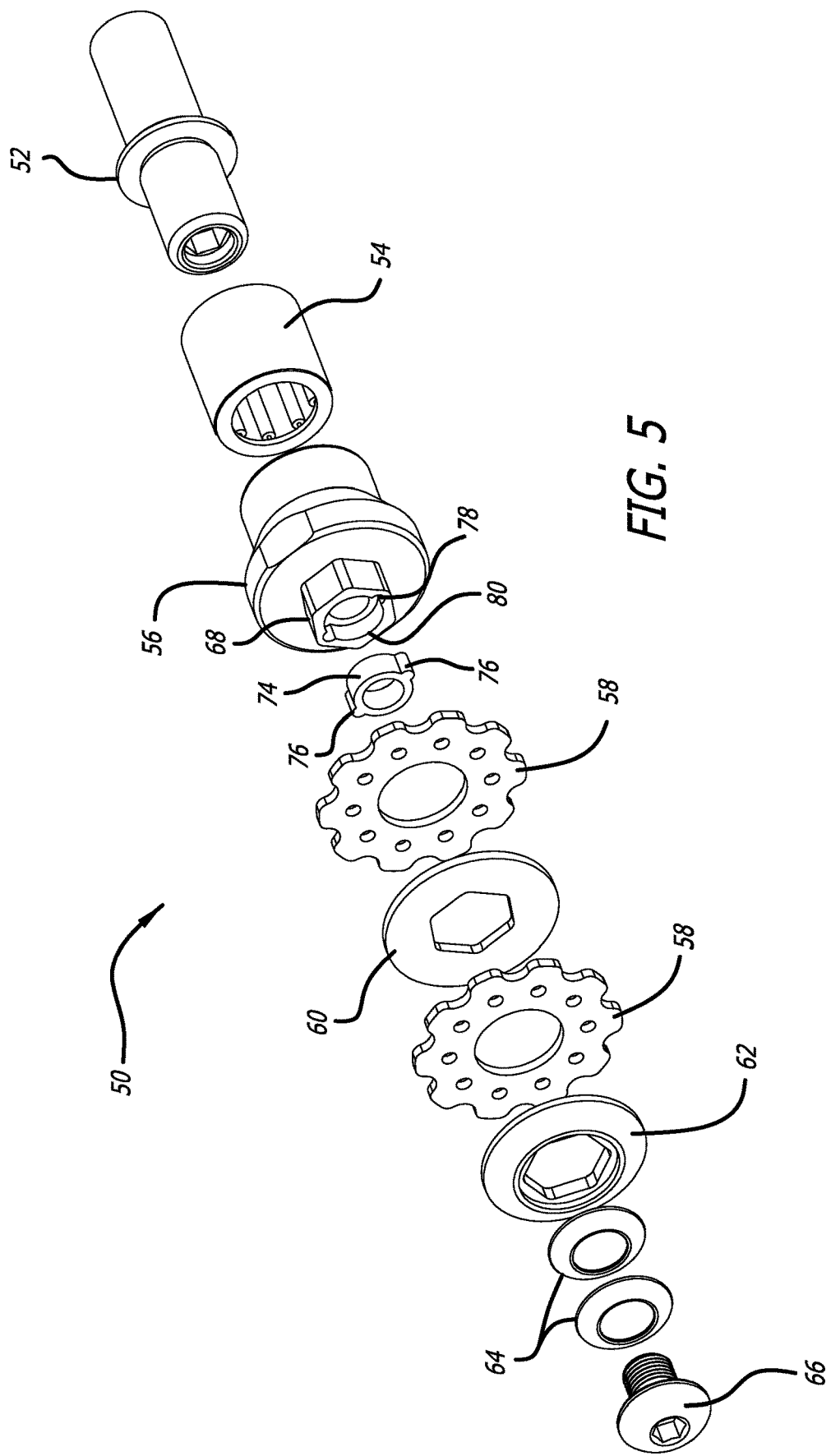
FIG. 5 illustrates a top right perspective exploded view of the damper assembly of FIG. 3.
Figure 6:
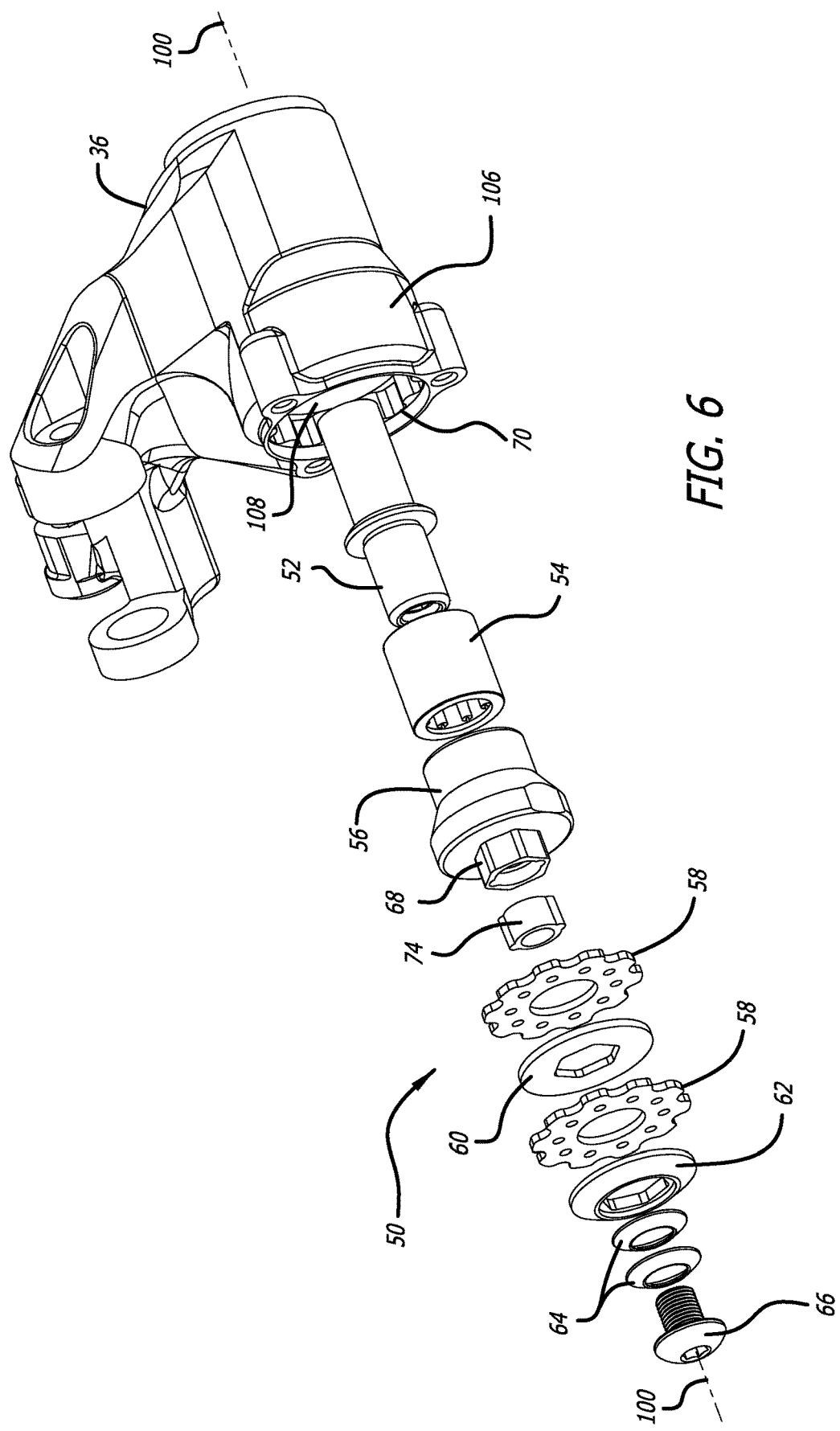
FIG. 6 illustrates another exploded view of the damper assembly of FIG. 3 in relation to a lower body portion of the rear derailleur assembly.

As shown in FIGS. 1-6 for purposes of illustration, an embodiment of the present invention resides in a rear derailleur assembly 20 that can be engaged to a frame 200 of a bicycle near a rear wheel (not shown) of the bicycle. A side of the rear derailleur assembly 20 facing the frame 200 may be referred to as an inward or inner side while an opposite side of the rear derailleur assembly 20 may be referred to as an outward or outer side. The rear derailleur assembly 20 is capable of moving a bicycle chain 210 laterally between gears (or sprockets or cogs) of a cassette 220 connected to the frame 200. The bicycle includes a control cable 230 extending between front and rear portions of the bicycle. The control cable 230 can be in the form of various cables including, without limitation, a Bowden-type control cable having an outer sheath and an inner wire. One end of the control cable 230 is connected to a shift control device (not shown) mounted on or near the bicycle's handlebar (not shown) at the front of the bicycle. The other end of the control cable 230 is connected to the rear derailleur assembly 20. As outlined above, tension on the control cable 230 affects movement of the bicycle chain 210 between gears (or sprockets or cogs) of the cassette 220 by controlling operation of the rear derailleur assembly 20.

The rear derailleur assembly 20 includes an upper body assembly 22 that acts as a base member by connecting the rear derailleur assembly 20 to a rear drop-out or rear axle holder (not shown) of the bicycle frame.

The rear derailleur assembly 20 also includes a chain guide (or chain cage) assembly 24 that engages the bicycle chain and moves the bicycle chain from one gear of the cassette to another gear of the cassette.

The rear derailleur assembly 20 further includes a controller assembly 26 operationally connecting the upper body assembly 22 to the chain cage assembly 24. As described in more detail below, movement of the controller assembly 26 causes movement of the chain cage assembly 24 which, in turn, moves the bicycle chain between gears of the cassette.

The rear derailleur assembly 20 additionally includes a lower body assembly 28 that acts as a moveable member operationally connecting the controller assembly 26 to the chain cage assembly 24. The lower body assembly 28 also operationally connects the upper body assembly 22 to the chain cage assembly 24 due to the controller assembly 26 operationally connecting the upper body assembly 22 to the lower body assembly 28.

The upper body assembly 22 includes an upper body portion 30, a mounting bolt (or fixing bolt) 32 extending through a bore in the upper body portion 30 for threadedly securing the rear derailleur assembly 20 to the bicycle frame, and a folding, spring-loaded cable stay member 34.

The cable stay member 34 acts as a support for the control cable 230, and yields under impact in order to avoid breaking or being damaged in the event of crashes or trail-side impacts. The cable stay member 34 protrudes out and extends away from the upper body portion 30 to receive the control cable 230 and is vulnerable to impact. The cable stay member 34 is pivotally connected to the upper body portion 30. The pivotal connection with the upper body portion 30 allows the cable stay member 34 to yield under impact if, for example, the right side of the bicycle frame impacts the ground during a crash, the bicycle tips over onto its right side and the cable stay member 34 contacts a hard surface, or the like. The spring-loaded pivotal connection allows the cable stay member 34 to move in only one plane. The cable stay member 34 remains rigid in the cable pull direction when pull force (i.e., tension) is applied to the control cable 230. The cable stay member 34 includes a cable guide bore through which the control cable 230 passes to be connected to the rear derailleur assembly 20. Openings on opposite sides of the cable guide bore can be the same size or different sizes, depending on the type of control cable used. For example, when the control cable 230 is in the form of a Bowden-type control cable having an outer sheath and an inner wire, the opening of the cable guide bore on an inward side of the rear derailleur assembly 20 receiving the control cable 230 may be sized and shaped to receive the outer sheath of the control cable 230 (e.g., the diameter of the opening of the cable guide bore may be larger than or at least large enough for press-fit engagement with the outer surface of the outer sheath of the control cable 230), while the opening of the cable guide bore on an outward side of the rear derailleur assembly 20 from which the control cable 230 extends may be sized and shaped to allow only the inner wire of the control cable 230 to pass through the opening on the outward side.

The chain cage (or chain guide) assembly 24 includes a chain cage that includes a pair of spaced apart, parallel cage plates (also referred to as inner and outer cage plates or inner and outer cage guides) with a pair of pulleys (or sprockets or jockey wheels) (i.e., an upper guide pulley and a lower idler (or tension) pulley) disposed therebetween. The plates are joined together at an upper end by a first pivot shaft, and joined together at a lower end by a second pivot shaft. The upper guide pulley is rotatably mounted on the first pivot shaft between the plates. The lower idler pulley is pivotally mounted on the second pivot shaft between the plates. The inner and outer cage plates may be made from various materials including, without limitation, durable cold-forged aluminum. The pulleys may include sealed precision pulley bearings to reduce friction and avoid contamination.

The lower body assembly 28 includes a lower body portion (movable member) 36 operationally connected to the chain cage assembly 24. The bodies of the upper and lower body assemblies 22, 28 may be made from various materials including, without limitation, a carbon fiber/nylon composite material; aluminum; plastic or the like.

As stated above, the controller assembly 26 operationally connects the chain cage assembly 24 to the upper body assembly 22. The controller assembly 26 includes a controller including an upper link arm (or upper pivot bar or inner pivot bar) and a lower link arm (or lower pivot bar or inner pivot bar) spaced apart from one another that acts as a linkage assembly for connecting the upper and lower body assemblies 22, 28. The upper link arm is pivotally connected at one end to the upper body portion 30 by a pivot pin. The lower link arm is pivotally connected at one end to the upper body portion 30 by a pair of spaced apart, coaxial pivot pins to form a split or two part pivot where the lower link arm pivotally engages the upper body portion 30 (the pivot pins passing through respective coaxial apertures in the lower link arm and the upper body portion 30), and allowing space between the two coaxial pivot pins. The upper and lower body portions 30, 36 are part of the controller assembly 26. The upper link arm is pivotally connected to the lower body portion 36 by a pivot pin at an end opposite the end pivotally connected to the upper body portion 30. The lower link arm is pivotally connected to the lower body portion 36 by a pivot pin at an end opposite the end pivotally connected to the upper body portion 30. The upper link arm includes an actuating arm extending downwardly from the upper link arm through an aperture of the lower link arm. The actuating arm is generally located on an outward facing rear portion of the upper link arm. In one particular embodiment, the actuating arm extends downwardly from the aperture (not shown) on the rear, outward portion of the upper link arm through which the pivot pin passes to engage the rear, outward portion of the upper link arm. The control cable 230 is secured to the actuating arm by a cable anchor bolt (or cable clamp) engaging the actuating arm.

The controller assembly 26 includes a spring (not shown) operationally engaging the controller (i.e., the upper and lower link arms). The spring is operationally connected at one end about one of the pivot pins and at the other end about another of the pivot pins to normally bias the upper and lower link arms in a first direction such that the lower body portion is normally biased outwardly away from the bicycle frame relative to the upper body portion 30 engaging the bicycle frame. In operation, the upper and lower link arms generally form a parallelogram with the upper and lower body portions 30, 36; the parallelogram rotating about the several pivot pins connecting the upper and lower body portions as the spring expands and contracts between strained and unstrained configurations. As the spring is strained and expands, the parallelogram rotates about the several pivot pins which, in turn, rotates the actuating arm of the upper link arm towards the split pivot and passes into a space between the pivots. The spring biases the chain cage assembly 24 to an innermost or outermost position relative to the gears of the cassette 220. The arrangement of the actuating arm and the split pivot provides a more compact design for the rear derailleur assembly 20. A high limit adjustment screw (or outer limit screw) and a low limit adjustment screw (or lower limit screw) are used to adjust the range the parallelogram rotates about the several pivot pins so that chain cage assembly 24 be positioned over no more than the highest gear and no less than the lowest gear. Turning the limit screws adjusts the limit of travel of the pulleys. Tightening the limit screws restricts the travel, while loosening the limit screws allows more travel. The purpose of the adjusting the limit screws is to find the tightest high limit screw setting that will allow a good shift to the outermost gear (i.e., the smallest in size) on the cassette, and the tightest lower limit screw setting that will allow a good shift to the innermost gear (i.e., the largest in size) on the cassette. The high limit screw is used to adjust the rear derailleur assembly 20 such that the upper pulley is centered with the center of the highest gear. An angle adjustment screw (or B-adjustment screw) is used to adjust the rear derailleur assembly 20 such that there are 5-7 mm in-between the top of the upper pulley and the bottom of the lowest gear on the cassette 220.

In use, the control cable 230 for actuating the rear derailleur assembly 20 passes through the cable bore in the cable stay 34 to operationally engage an end of the actuating arm. Tension on the control cable causes relative movement between the upper body portion 30 and the lower body portion 36, moving the upper and lower link arms in a second direction opposite the first direction where the lower body portion 36 and the chain cage assembly 24 are normally biased outwardly away from the bicycle frame 200, and moving the lower body portion 36 and the chain cage assembly 24 laterally towards the bicycle frame 200. As stated above, the amount of tension on the control cable 230 determines which direction the bicycle chain 210 will move in (i.e., from lower gear to higher gear or from higher gear to lower gear). The shift control device (not shown) allows the rider of the bicycle to pull (increase tension) or release (decrease tension) the control cable 230. With the control cable 230 (e.g., an inner wire if the control cable is a Bowden-type cable), the chain cage assembly 24 can be moved laterally by moving the controller assembly 26 via the amount of tension on the inner wire. One end of the inner wire is connected the actuating arm by the cable anchor bolt, and the other end of the inner wire is connected to the shift control device mounted on the bicycle handlebar. When the shift control device is operated by the rider, tension on the inner wire of the control cable 230 is pulled or released. Pulling the inner wire (i.e., increasing tension on the inner wire) of the control cable 230 moves the chain cage assembly 24 against the biasing force of the spring, while releasing the inner wire (i.e., decreasing tension on the inner wire) causes the chain cage assembly 24 to move due to the biasing force of the spring. Increasing tension on the control cable 230 causes the chain cage assembly 24 to move in one direction (which, in turn, moves the bicycle chain in that same direction), while releasing tension on the control cable 230 causes the chain cage assembly 24 to move in another direction (generally the opposite direction the chain cage assembly 24 moves in when tension is increased). Thus, the chain cage assembly 24 (along with the bicycle chain) can be moved laterally by increasing or decreasing tension on the control cable 230. When the control cable 230 is pulled (i.e., tension increased), the upper and lower link arms pivot inwardly against the force of the spring so as to move the chain cage assembly 24 inwardly towards the bicycle which, in turn, moves the bicycle chain 210 from one gear to another on the cassette 220. When the control cable 230 is released (i.e., tension decreased), the upper and lower link arms pivot outwardly, pulled by the force of the spring, so as to move the chain cage assembly 24 outwardly away from the bicycle which, in turn, moves the bicycle chain 210 from one gear to another on the cassette 220.

In the alternative, the rear derailleur assembly may be an electric derailleur that does not use a mechanical cable (housing included (e.g., a Bowden-type control cable)), cable stay member 34, or high-force parallelogram spring to control movement of the chain cage assembly 24. Instead, an electro-mechanical derailleur utilizes an electric motor (the electric motor may or may not be connected to a reduction gearbox) that, when given power, moves the chain cage assembly 24 into a new gear position. Similarly, the mechanical shifting mechanism (or shifter) is also replaced with an electronic version that has a series of buttons that allow the user to control movement of the chain cage assembly 24. Furthermore, an electro-mechanical derailleur can be either what is called wired or wireless. For example, a wired electro-mechanical derailleur works in conjunction with an electronic shifting mechanism (or shifter) that sends a signal to the rear derailleur assembly through a set of wires electro-mechanically interconnecting the shifter and rear derailleur assembly. The signals from the shifter communicate a gear shift to the rear derailleur assembly. A wireless electromechanical shifter is a shifter that sends a signal through a wireless protocol to the rear derailleur to shift the gear. The shifter and derailleur are able to send/receive wireless signals from one another. There is also a battery or other power source that will either be attached to the rear derailleur assembly, the shifter, or mounted to the bicycle frame.

As stated above, the lower body portion 36 is operationally connected to the chain cage assembly 24. The lower body portion 36 includes an oversized front top pivot where the pivot pin pivotally engages the upper link arm with the lower body portion 36. The front top pivot provides stiffness and a cantilevered stationary pin with a head mounted to the lower body portion 36, providing a design that also minimizes the dimension the rear derailleur assembly 20 protrudes outwardly away from the bicycle.

The lower body portion 36 is rotatably secured to the cage plate closest to lower body portion 36, with the entire cage assembly 24 having limited rotation about a pivot axis 100 relative to the lower body portion 36, as illustrated by arrow 102. As discussed in more detail below, the chain cage assembly 24 is spring-loaded about the pivot axis 100 in one direction of rotation, and there is a limited range of rotation between the chain cage assembly 24 and the lower body portion 36.

As discussed above, the rear derailleur assembly 20 includes a chain cage assembly 24 that maintains tension on the bicycle chain 210. The chain cage assembly 24 is coupled to the lower body portion (movable member) 36. In order to maintain function of the drive system, the bicycle chain must have proper tension to stay seated on the pulleys (cogs) of the chain cage assembly 24 when the bicycle hits a bump on a surface the bicycle is riding over. However, if the assembly 20 lacks a dampening mechanism or damper, the chain cage assembly 24 may rotate relative to the lower body portion 36 beyond a reasonable amount in certain rough conditions. A "reasonable amount" is defined as the point where the bicycle chain 210 will not become unseated from the pulleys (cogs) of the chain cage assembly 24. To maintain a reasonable amount of rotation of the chain cage assembly 24 relative to the lower body portion 36, the assembly 20 includes a one-way damper assembly (clutch assembly, damping assembly, dampening assembly, dampening mechanism, or damping arrangement) 50 for pivotal movement of the chain cage assembly 24 that creates friction to slow or reduce rotation speed of the chain cage assembly 24 around the pivot axis 100 in an opposite direction of rotation from the direction of rotation provided by the force of the spring-load. In this manner, the one-way damper assembly 50 provides rotational resistance to pivotal movement of the chain cage assembly 24 caused by, for example, the bicycle hitting a bump on the surface the bicycle is riding over. The damper assembly 50 reduces angular acceleration in the direction the bicycle chain 210 is pulling as the chain cage assembly 24 moves forward and the damper assembly 50 provides no resistance as the chain cage assembly 24 travels back. Thus, in the direction of rotation provided by the spring-load, there is no damping provided by the damper assembly 50. The damper assembly 50 is located in a knuckle 106 of the lower body portion 36. The knuckle 106 includes a generally cylindrical recess or bore 108. The damper assembly 50 is housed within the bore 108 of the knuckle 106 of the lower body portion 36. A chain guide spring 104, via the chain cage assembly 24, applies a sufficient tension to the bicycle chain 210. The damper assembly 50 changes the acceleration of the chain cage assembly 24 about the pivot axis 100 but the acceleration is not always uniform due to differences in terrain (i.e., there will be different accelerations of the chain cage assembly 24 as acceleration is affected by the type of terrain the user is riding on, with different terrains causing different accelerations).

The damper assembly 50 includes a central shaft (central axle) or input shaft 52 (the pivot axis 100 runs through a central longitudinal axis of the input shaft 52 and, by extension, the damper assembly 50), a one-way bearing 54 (one way clutch), a friction clutch 82, and a clamp bolt 66. The friction clutch 82 includes a bearing housing 56, and a disc assembly 72. The disc assembly 72 includes one or more friction discs 58, one or more intermediate discs 60, a pressure plate 62, and a single or series of disc springs 64 that apply an axial force. In the alternative, a single or series of wave washers (or wave springs) may be used to apply the axial force instead of a single or series of disc springs 64. The damper assembly 50 is coupled to both the lower body portion 36 and the chain cage assembly 24. The damper assembly 50 functions in a way that it only applies friction in one rotational direction. The one-way bearing 54 rotates in one direction only in reference to the input shaft 52.

One-way bearings may also be referred to as clutch bearings, drawn-cup needle-roller clutches, or anti-reverse bearings. In general, one-way bearings comprise: a casing (i.e., the outer part that is typically in the form of a piece of steel tubing with the ends formed over to retain the inner components); needle rollers (e.g., hard chrome plated steel pins that provide a smooth, consistent rolling surface for contact with the input shaft 52); springs (e.g., heat treated strips of spring steel that control the position of the needle rollers), and a cage (i.e., the inner part (typically made from a hard plastic material) that functions as a retaining, limiting and locking mechanism for the needle rollers and spring). For example, the cage is designed in such a way as to allow the needle rollers to move sideways relative to the input shaft 52. The cage also has a ramp/wedging mechanism built in to act as a brake/clutch for the needle rollers. For example, the one-way bearing 54 includes a central generally cylindrical recess 84 which receives and engages an end portion of the input shaft 52. The central generally cylindrical recess generally defining an inner diameter of the one-way bearing 54. The cylindrical input shaft 52 is held within the recess 84 of the one-way bearing 54 by frictional contact between the cylindrical input shaft 52 and the needle rollers (the needle rollers encircling the input shaft 52 defining an inner diameter slightly less than that of the cage as well as generally defining the inner diameter of the one-way bearing 54). The one-way bearing 54 may come in various forms including, without limitation, a needle-roller bearing in which the rollers inside the bearing cage turn freely in one direction, while in the opposite direction the rollers wedge against the cage, thereby preventing motion in that direction. When turning force is applied in the locking direction, the torque is transferred instead to an outside diameter of the one-way bearing 54; this surface may or may not permit motion at its interface, depending on how loosely or tightly it is captured by any surrounding structure, such as the bearing housing 56. For example, the one-way bearing 54 is disposed and held within a central generally cylindrical recess 86 of the bearing housing 56. The one-way bearing 54 provides virtually zero friction in the direction of deployment (e.g., the needle roller bearing has a very low coefficient of friction on about 0.003 (kinetic). Compare, for example, to a coefficient of friction of 0.05 for waxed skis on snow (about sixteen times higher), or 0.04 for TEFLON sliding on TEFLON).

In operation, an end of the cylindrical input shaft 52 engages with the inside diameter of the one-way bearing 54 (e.g., the end of the cylindrical input shaft 52 is press-fit into the array of roller needles within the one-way bearing 54). For reference, the "inner diameter" of the one-way bearing 54 refers to the engagement interface between the input shaft 52 and the one-way bearing 54. The "outer diameter" of the one-way bearing 54 refers to the engagement interface between the one-way bearing 54 and the bearing housing 56. The one-way bearing 54 allows motion in one direction only (i.e., in a "free" direction), and prohibits motion in the opposite direction (i.e., the one-way bearing 54 is "locked" with respect to motion in the opposite direction). When the cage of the one-way bearing 54 is rotating in the "free direction," the needle rollers are resting against the springs, which control how far the needle rollers can move in that direction. As there is no load on it in this position, the bearing spins freely. When the cage of the one-way bearing 54 is "locked," the needle rollers are lodged between the cage and the input shaft 52, where the rollers cannot rotate.

As stated above, the one-way bearing 54 is press-fit into the bearing housing 56 so that the one-way bearing 54 is held by and disposed within the generally cylindrical central aperture of the bearing housing 56 such that the bearing housing 56 rotates in unison with the one-way bearing 54. The one-way bearing 54 always moves with the bearing housing 56 as they are press-fit together; moving in unison with the input shaft 52 when the one-way bearing 54 is engaged. The bearing housing 56 remains stationary with the knuckle 106 when the one-way bearing 54 is disengaged. The bearing housing 56 will rotate relative to the one-way bearing 54 in the opposite direction. The friction and intermediate discs 58, 60 are mounted to a hexagonal (i.e., six-sided) spline pattern or spline 68 atop the bearing housing 56 by means of the clamp bolt 66 with the disc springs 64, pressure plate 62, and discs 58, 60 sandwiched between the clamp bolt 66 and the bearing housing 56. In one embodiment, a single intermediate disc 60 may be sandwiched between two friction discs 58. Alternatively, when there is more than one (1) intermediate disc 60, and a plurality of friction discs 58, the friction and intermediate discs 58, 60 alternate in position. The intermediate discs 60 may be in the form of round, smooth-edged discs having hexagonal central apertures sized to fit the hexagonal spline 68. The pressure plate 62 also has a hexagonal central aperture sized to fit the hexagonal spline 68. In the alternative, the spline pattern or spline 68 can be any polygonal shape including, but not limited to, three-sided, four-sided, five-sided, and so on, with the intermediate discs 60 and the pressure plate 62 having matching-shaped central apertures sized to fit the polygonal spline 68. The friction discs 58 may be "toothed" discs with round central apertures that clear the hexagonal spline 68. When the discs 58, 60 are assembled, the friction discs 58 operationally engage the interior wall of the bore 108 with the "teeth" of a spline pattern of each of the friction discs 58 meshing with a spline pattern of internal grooves 70 on the interior wall of the bore 108. The spline pattern of the bore 108 is configured to engage the spline pattern of the damper assembly 50 such that a portion of the damper assembly 50 is stationary relative to the lower body. Thus, the toothed friction discs 58 are stationary relative to the lower body portion 36, and the smooth intermediate discs 60 rotate with the bearing housing 56. As the clamp bolt 66 is tightened, frictional interaction between the discs 58, 60 increases so as to transmit the rotation of the bearing housing 56 to the lower body portion 36. The bearing housing 56 has a semi-loose fit within the recess 108 of the knuckle 106, with the tapered surface(s) of the bearing housing 56 assisting in holding the damper assembly 50 in place inside the recess 108 of the knuckle 106; keeping the damper assembly 50 from rocking back and forth under torque, and centered around the input shaft 52.

The damper assembly 50 further includes an insert 74 disposed within a bore of the hexagonal spline 68. The insert 74 engages the clamp bolt 66. The insert 74 may be made of various materials including, plastic, metal or the like. The insert 74 allows a user to thread and un-thread the clamp bolt 66 while still holding it's "at rest" position (i.e., at the last position the user left it at (e.g., for example, the position of the clamp bolt 66 relative to the bearing housing 56), effectively changing the torque that the damper assembly 50 outputs. The insert 74 prevents the clamp bolt 66 from vibrating out of engagement with the hexagonal spline 68 of the bearing housing 56 during use. The insert 74 allows the user to change the resting position of the clamp bolt 66. The insert 74 includes a keyed portion 76 that fits into a mating key portion 78 of a central threaded bore 80 of the 68 of bearing housing 56. The clamp bolt 66 threadedly engages the bore 80 of the hexagonal spline 68. Due to the ability of the insert 74 to "grip" the clamp bolt 66 and be keyed to the hexagonal spline 68 of the bearing housing 56, the insert 74 retains the clamp bolt 66 but still allows the user to change the position of the clamp bolt 66.

In an alternative embodiment, the damper assembly 50 does not include an insert 74 and the clamp bolt 66 is not adjustable. Instead, the clamp bolt 66 is set in position with a thread locker at the factory, and is not adjustable. The thread locker keeps the torque set at a factory determined amount and the user will not be able to adjust the torque.

A chain guide spring 104 (e.g., a torsion spring) is loaded to bias the chain cage assembly 24 in one direction. A stop 40 extending outward from the chain cage assembly 24 prevents the chain cage assembly 24 from rotating past a certain point in the direction of rotational bias imparted by the spring 104 when the stop engages the lower body portion 36, preventing further rotational movement of the chain cage assembly 24 relative to the lower body portion 36. The spring 104 biases the chain cage assembly 24 in a chain tensioning direction around the damper assembly 50 operationally engaging the chain cage assembly 24 via the input shaft 52 operationally engaging the chain cage assembly 24 coaxial with the front knuckle bore 108 and passing through the one-way bearing 54. The input shaft 52 itself rotate within the bore 108 in the same direction as the chain cage assembly 24 is rotating. The spring 104 operationally engages the damper assembly 50 so that torsional force is transmitted to the damper assembly 50 from the spring 104. The damper assembly 50 is housed in the bore 108 of the knuckle 106 of the lower body portion 36 so that the chain cage assembly 24 can apply a sufficient tension to the bicycle chain.

In use, the damper assembly 50 operates as follows. When the bicycle experiences a large bump, some energy from the bump is translated in to the bicycle chain which will cause the bicycle chain to deflect in a direction out of phase with the bicycle. The deflection of the bicycle chain results in a force on the chain cage assembly 24, causing the chain cage assembly 24 to rotate forward (i.e., in the direction of travel).

As the chain cage assembly 24 begins to rotate relative to the lower body portion 36, the input shaft 52 is in engagement with the one-way bearing 54, with the one-way bearing 54 being seated in the bearing housing 56 which, in turn, begins to rotate in the direction of the input shaft 52. The bearing housing 56 retains the hexagonal spline 68. The hexagonal pattern of the central apertures of the intermediate disc(s) 60 and the pressure plate 62 engage the hexagonal pattern of the spline 68. As the bearing housing 56 rotates in the direction of the input shaft 52, the pressure plate 62 and intermediate discs 60 engaged with the hexagonal pattern of the spline 68 also rotate in the same direction along with the input shaft 52.

The friction discs 58 are disposed between every rotating surface of the bearing housing 56, intermediate disc(s) 60, and the pressure plate 62. As stated above, the friction discs 58 have teeth forming a spline pattern of teeth disposed on an outer diameter of the friction discs 58 that engage the spline of grooves 70 within the bore 108 of the lower body portion 36 and do not rotate with the chain cage assembly 24. The friction discs 58 are fixed to the knuckle 106 while the intermediate disc(s) 60, bearing housing 56, and pressure plate 62 all rotate with the input shaft 52. Both the pressure plate 62 and the bearing housing 56 have friction surfaces (i.e., the mating surfaces between the bearing housing 56 and the adjacent friction disc 58, and between the pressure plate 62 and the adjacent friction disc 58) as well. The pressure plate 62, bearing housing 56, and intermediate disc(s) 60 all rotate against the friction discs 58 as the chain cage assembly 24 rotates.

The pressure plate 62 is located on one end of the damper assembly 50. The pressure plate 62 applies pressure to both the intermediate disc(s) 60 and the friction discs 58 via at least one disc spring 64 and the clamp bolt 66. The force is reacted by the mating surface of the bearing housing 56 causing a "clamping" of the discs 58, 60. As the clamp bolt 66 is tightened, the disc spring(s) 64 apply more normal force to the pressure plate 62. With the increase of normal force comes an increase of rotational friction as both the intermediate disc(s) 60 and the friction discs 58 move in opposite directions. The frictional force is adjustable by the amount the clamp bolt 66 is rotated.

The damper assembly 50, in effect, reduces the acceleration of the chain cage assembly 24 by absorbing energy. In this application, the energy absorbed is in the form of heat, with the heat being generated through the 'rubbing' or 'twisting' of the friction discs 58 and intermediate discs 60 together. Torque generated from the chain cage assembly 24 is directed through the input shaft 52 to the one-way bearing 54. The one-way bearing 54 is attached to the bearing housing 56. The bearing housing 56 is indexed to the intermediate discs 60. In summary, the intermediate discs 60 translate the torque from the chain cage assembly 24 in one direction. The friction discs 58 are stacked in-between the intermediate discs 60, the bearing housing 56, and the pressure plate 62, and are indexed to the lower body portion (movable member) 36. The pressure plate 62 applies a normal force to the discs 58, 60. As the normal force increases, the resistant torque is also increased in proportion. The dampening effect is changed by changing the normal force. An adjustment device, in the form of the clamp bolt 66, changes the normal force. A benefit of changing dampening effect benefits the use as the force on the shifter increases during shifting as the dampening effect is increased. That is, there is some feedback from the damper assembly 50 that is translated into the shifter. While the user shifts to a lower gear, the rear derailleur moves, but the chain guide assembly 24 stays in an initial position until the bicycle chain 210 catches and changes gear. The chain guide assembly 24 rotates about the pivot axis 100 as a gear changes. This rotation engages the chain guide spring 104 and the damper assembly 50. Therefore, the user is effectively pushing against the damper assembly 50 when the user shifts to a lower gear. This does not happen on shifts to a higher gear since the gear shift goes in the opposite direction. By fine tuning the clutch resistance, the user can find a spot where the damper assembly 50 works just enough without causing too much effort to shift.

A cap 110 engages the lower body portion 36 (e.g., the cap 110 may be bolted to the lower body portion 36) and covers the opening to the bore 108 of the knuckle 106. As illustrated, three fasteners 112 pass through spaced-apart apertures (not shown) of the cap 110, and enter spaced-apart apertures (not shown) of the lower body portion 36 (the apertures of the cap 110 being aligned with the apertures of the lower body portion 36) to securably fasten the cap 110 to the lower body portion 36 and enclose the damper assembly 50. An advantage of this damper assembly 50 as compared to others is that this damping assembly 50 uses fewer parts and requires no additional friction-producing elements to be aligned or fixed in place. The damper assembly 50 is also lightweight and simple for manufacturing.

In addition, the claimed invention is not limited in size and may be constructed in various sizes in which the same or similar principles of operation as described above would apply. Furthermore, the figures (and various components shown therein) of the specification are not to be construed as drawn to scale.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "front," "rear," "left," "right," "inner," "outer," "beneath", "below", "lower", "above", "upper", "horizontal", "vertical", "lateral", "longitudinal" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Moreover, features described in connection with one embodiment of the invention may be used in conjunction with other embodiments, even if not explicitly stated above. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A rear derailleur assembly for mounting to a bicycle, wherein the bicycle includes a frame, comprising:
   an upper body for operationally engaging the rear derailleur assembly to the frame;
   a chain cage for engaging a chain of the bicycle;
   a controller pivotally connected to the upper body;
   a lower body operationally connected to the chain cage, pivotally connected to the controller, and pivotally connected to the chain cage about a pivot axis; and
   wherein the lower body includes a damper assembly for providing rotational resistance as the chain cage rotates in a first direction about the pivot axis, and a recess within which the damper assembly is disposed; wherein the damper assembly includes a disc assembly having a spline pattern; wherein the disc assembly includes a plurality of adjacent discs; and wherein the recess includes a spline pattern configured to engage the spline pattern of the disc assembly such that a portion of the damper assembly is stationary relative to the lower body.

2. The rear derailleur assembly of claim 1, wherein the damper assembly includes an input shaft engaging the chain cage and rotational therewith; a friction clutch; and a one-way bearing engaging the friction clutch and the input shaft; wherein the friction clutch engages the one-way bearing so that when the input shaft rotates with respect to the lower body in a second direction opposite the first direction, the one-way bearing rotates with the input shaft in the second direction.

3. The rear derailleur assembly of claim 1, wherein the damper assembly includes a clamp bolt; wherein rotation of the clamp bolt in a first direction increases axial force on the disc assembly and rotation of the clamp bolt in a second direction opposite the first direction decreases axial force on the disc assembly, and wherein the axial force provides rotational resistance of the chain cage relative to the lower body.

4. The rear derailleur assembly of claim 1, further including a spring biasing the chain cage in one direction; and wherein the spring engages the damper assembly so that torsional force is transmitted to the damper assembly.

\* \* \* \* \*